United States Patent
Robbins

(10) Patent No.: US 7,181,300 B2
(45) Date of Patent: Feb. 20, 2007

(54) SINGLE USE MEDIA DEVICE

(76) Inventor: Gerald V Robbins, 57 Edgemere Ave., Greenwood Lake, NY (US) 10925

( * ) Notice: Subject to any disclaimer, the term of this patent is extended or adjusted under 35 U.S.C. 154(b) by 1236 days.

(21) Appl. No.: 09/907,734

(22) Filed: Jul. 18, 2001

(65) Prior Publication Data

US 2003/0016940 A1  Jan. 23, 2003

(51) Int. Cl.
  *G06F 17/00* (2006.01)
  *G06Q 20/00* (2006.01)
(52) U.S. Cl. .................. 700/94; 700/231; 700/234; 705/16
(58) Field of Classification Search ............... 700/94, 700/231, 234; 705/16
See application file for complete search history.

(56) References Cited

U.S. PATENT DOCUMENTS

| | | | |
|---|---|---|---|
| 3,718,906 A * | 2/1973 | LIghtner | 379/77 |
| 4,587,643 A | 5/1986 | Monen et al. | |
| 4,953,153 A | 8/1990 | Suzuki | |
| 5,023,741 A * | 6/1991 | Conti et al. | 360/132 |
| 5,449,012 A | 9/1995 | Friedman | |
| 5,494,443 A | 2/1996 | Nakai et al. | |
| 5,633,839 A * | 5/1997 | Alexander et al. | 700/234 |
| 5,670,730 A | 9/1997 | Grewe et al. | |
| 5,691,964 A | 11/1997 | Niederlein et al. | |
| 5,726,898 A * | 3/1998 | Jacobs | 700/231 |
| 5,905,429 A * | 5/1999 | Hornstein et al. | 340/384.6 |
| 5,986,200 A | 11/1999 | Curtin | |
| 6,001,065 A | 12/1999 | DeVito | |
| 6,067,562 A | 5/2000 | Goldman | |
| 6,182,128 B1 | 1/2001 | Kelkar et al. | |
| 6,426,826 B1 * | 7/2002 | Marco | 359/230 |
| 6,788,982 B1 * | 9/2004 | Lapstun et al. | 700/94 |
| 2001/0004397 A1 * | 6/2001 | Kita et al. | 381/334 |
| 2002/0111857 A1 * | 8/2002 | Harris et al. | 705/14 |
| 2003/0112737 A1 * | 6/2003 | Thompson et al. | 369/284 |

FOREIGN PATENT DOCUMENTS

| | | |
|---|---|---|
| DE | 19943306 | 4/2000 |
| WO | WO 00/58963 | 3/1999 |

* cited by examiner

*Primary Examiner*—Sinh Tran
*Assistant Examiner*—Daniel R. Sellers
(74) *Attorney, Agent, or Firm*—Michael I. Kroll

(57) ABSTRACT

The present invention discloses an audio-visual retrieval and playback apparatus for a single use which has a housing having a viewing screen thereon 22 which can be sealed and packaged 14 having a headphone 16 with a pair of earpiecess 18 along with wiring 20 which connects the headphone to the housing. The present invention has a play button 24, along with a stop button 26 having slot 28 which accepts audiovisual cards along with a pair of ports 30, 32 for interfacing with another computer. Data can be retrieved from an external database having a plurality of audio video data for download. A user views the collection of audio video data and selects an audio video datafile for download to a disposable player that will retain the audio video datafile for later use.

8 Claims, 10 Drawing Sheets

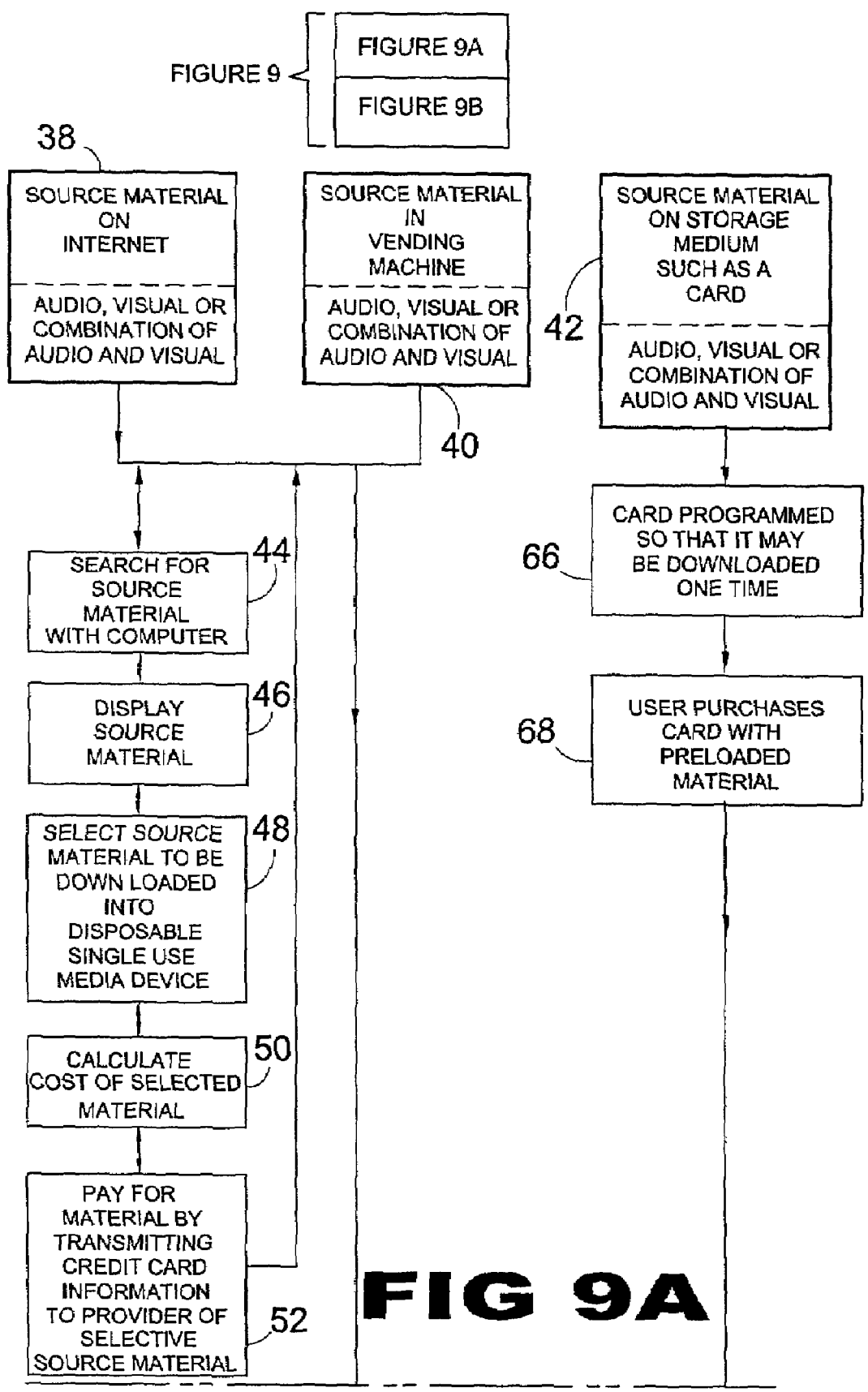

SINGLE USE MEDIA DEVICE

BACKGROUND OF THE INVENTION

1. Field of the Invention

The present invention relates generally to audio video equipment and, more specifically, to a disposable audio video player. The single use data to be played can be supplied with the audio video player when purchased or selectively downloaded from the Internet.

2. Description of the Prior Art

There are other audio devices designed for audio/video playback. Typical of these is U.S. Pat. No. 4,587,643 issued to Monen et al. on May 6, 1986.

Another patent was issued to Suzuki on Aug. 28, 1990 as U.S. Pat. No. 4,953,153. Yet another U.S. Pat. No. 5,449,012 was issued to Friedman on Sep. 12, 1995 and still yet another was issued on Feb. 27, 1996 to Nakai et al. as U.S. Pat. No. 5,494,443.

Another patent was issued to Grewe on Sep. 23, 1997 as U.S. Pat. No. 5,670,730. Yet another U.S. Pat. No. 5,691,964 was issued to Niederlein on Nov. 25, 1997. Another was issued to Curtin on Nov. 16, 1999 as U.S. Pat. No. 5,986,200 and still yet another was issued on Dec. 14, 1999 to DeVito as U.S. Pat. No. 6,001,065.

Another patent was issued to Hoffmann on Apr. 20, 2000 as Deutschland Patent No. DE 19 943 306. Yet another U.S. Pat. No. 6,067,562 was issued to Goldman on May 23, 2000. Another was issued to Ansell et al. on Oct. 5, 2000 as W.I.P.O. Patent No. WO 00/58963 and still yet another was issued on Jan. 30, 2001 to Kelkar et al. as U.S. Pat. No. 6,182,128.

Apparatus permits the use of a known optical compact audio disc for providing a larger memory capacity so that data other than audio data can be reproduced therefrom while maintaining consistency with respect to signal format and signal processing, such as error correcting methods and recording data formats and the like, by providing write clock signals and read-out clock signals for reading into and out two memories the main digital data signal by using a subdigital data signal that is recorded on the disc along with the main digital data and which is reproduced from the disc at the same time as the main data in order to provide addressing of the main digital data on a more accurate level and with finer resolution, and a control system searches a playback location of the main digital data based upon the subdigital data as read out from the buffer memory, in which subdigital data has been written by the write clock signal.

A data reproducing device having a reading device for reading digitally recorded music data and image data from a data carrier, and data processing device for forming a music signal and an image signal according to the music data and image data thus read, and applying the music signal and image signal to a sound generating apparatus and display device, respectively, wherein the data processing device monitors time data recorded in the record carrier, and suspends, upon detection of the discontinuity of the time data, the image reproduction by the display device.

A hand-held umbrella with a mechanism for rotating the stem and dome of the umbrella relative to the handle without manual rotation of the handle or umbrella. The rotation is created by a battery-operated motor forming a portion of the handle and adapted to receive the end of the stem opposite of the dome. The exterior surface of the dome may have a picture message imprinted thereon which has the appearance of animated movement when the dome is rotated. A speaker and mechanism for producing audible sound are also incorporated into the handle. In one embodiment, the music is contained on a sound synthesizer chip.

A karaoke system includes: reproduction unit for reproducing a MIDI sound source control information for karaoke song from a karaoke data recording medium, the MIDI sound source control information including playing time data of the karaoke songs; operation unit for inputting request of at least one desired karaoke song and karaoke playing time; calculation unit for obtaining playing time data of the requested karaoke songs and for calculating total playing time required for playing all of the requested karaoke songs; determination unit for comparing the total playing time with remaining playing time calculated on the basis of the karaoke playing time and for determining whether all of the requested songs can be played within the remaining playing time or not; and display unit for displaying a notice related to the result of the determination of the determination unit.

A protocol for labeling various types of data contained in a music chip. The protocol includes a hierarchical arrangement of headers for storing information about selections on the chip and the method in which they were coded in the memory of the chip. A global header located at the very start of memory will specify information needed to successfully decode the content of the music chip. This will include, for example, the necessary bit rate, as well as information pertaining to a specific PAC (Perceptual Audio Coding) algorithm employed in recording audio on the chip. In addition to the global header, each chip will have a section of memory allocated to a table of contents. The table of contents will include information on play times, song titles, music category and artist. Individual track selections will be listed as part of the table of contents by individual headers. The individual header contains a music field to which a track belongs, for example, classical, jazz, country, rock, etc., an artist field, and an address field which pertains to the information for addressing each track selection. Information from the headers is self-registered or automatically downloaded when a chip is loaded into a player/juke box device. The concept of self-registering general information included within the headers allows a user to select by type of music, artist, etc. for music selections made over a period of time. In addition, the present invention provides a method for segmenting memory in an integrated circuit chip wherein the integrated circuit chip is adapted for use in an audio player and the memory has pre-recorded audio stored therein. The method includes the steps of storing in a global header parameters corresponding to encoding techniques used in storing the pre-recorded audio in memory and coding in at least one individual header data fields indicative of general description information for individual tracks of the pre-recorded audio.

A music playing system includes a number of music playback units with playback changer devices, coding units, and ISDN cards. Each of the music playback units is provided with playable pieces of music. There is at least one input unit by means of which the pieces of music to be played on a playback unit are selected. In addition, there is a central computer with a memory in at least one playback unit, with the memory storing data about the pieces of music available in the playback units. The playback units can be connected between themselves and to the central computer via remote data transmission lines.

An interactive music playback device includes a sequencer for processing audio information corresponding to a song or other selected piece of music. The audio information may be retrieved from a PCMCIA card or other suitable solid state data storage cartridge which is inserted in a slot in the playback device. The sequencer arranges the audio information in a playback sequence based on one or more user-specified playback parameters, such as tempo, key and playback duration. Voice and instrument synthesizers receive the playback sequence and generate therefrom respective vocal and instrumental portions of the selected piece of music. The playback device may operate in a verse-shuffle mode of operation, in which the sequencer arranges the playback sequence to include randomly-selected verses of the selected piece of music interspersed with a chorus of the selected piece of music. The parameters of the playback sequence may also be varied in accordance with measures of external conditions as received from one or more environmental sensors. The playback device may also include a network connection for use in downloading the audio information from a network to the playback device.

A method and apparatus are disclosed for measuring and performing real-time FFT analysis of bioelectrical signals such as (EEG and EMG) for the control of systems. Passive and active interaction with various electronic media such as video games, movies, music, virtual reality, and computer animations is also discussed. A method and apparatus for detecting the presence of a subject in a controlled area and for controlling real or virtual spaces is also disclosed.

The tariff charging method has each digitized music title provided with inaudible tariff information, which is logged within an internal memory (6) of the mobile telephone (5) when the music title is played and transmitted to the telephone service provider, via the telephone network.

A digital radio broadcast station which includes a common digital database having stored therein a plurality of at least several hundred (preferably at least 1800) different selections of music to be played and broadcast by the radio station. A processor system is provided for programming the operation of the digital radio broadcast station with a sequence of music selections, which are subsequently retrieved in order from the common digital database and played over the digital radio broadcast station. The processor system preferably includes a main computer system for operating the radio station, and also a backup computer system for operating the radio station in the event of a failure of the main computer system. The processor system is preferably based upon reduced instruction set computing architecture, and preferably comprises an IBM RS/6000 system with an AIX operating system. The common digital database comprises a disk array storage, preferably a dual port RAID disk array. The digital radio broadcast station also includes a plurality of work station consoles for use by personnel responsible for operating the radio station such as disc jockeys and engineers.

Data such as a musical track is stored as a secure portable track (SPT) which can be bound to one or more players and can be bound to a particular storage medium, restricting playback of the SPT to the specific players and ensuring that playback is only from the original storage medium. The SPT is bound to a player by encrypting data of the SPT using a storage key which is unique to the player, is difficult to change, and is held in strict secrecy by the player. The SPT is bound to a particular storage medium by including data uniquely identifying the storage medium in a tamper-resistant form, e.g., cryptographically signed. The SPT can also be bound to the storage medium by embedding cryptographic logic circuitry, e.g., integrate circuitry, in the packaging of the storage medium. The SPT is bound by encrypting an encryption key using the embedded logic. By using unique cryptographic logic, only that particular storage medium can decrypt the encryption key and, therefore, the data of the SPT encrypted with the encryption key. To allow a user to playback the SPT on a number of players, players can share storage keys with one another. Such key sharing is done in a cryptographically secure manner. Before downloading an SPT to a particular external player, the ability of the external player to enforce restrictions placed upon the SPT is verified.

A music distribution system is divided into a plurality of regional networks each including a plurality of users. Each of the regional networks includes a distribution center to which the users of that region are connected. Each distribution center is provided with a library in which is stored a plurality of music titles. A user sends a request to the distribution center via an existing telephone network or cable network. Upon receiving the user's request, the distribution center locates and retrieves the requested data file stored in the regional library, and then transmits the requested file to the user via the existing cable service. At the user's destination, electronic equipment such as a television or a stereo receiver system may provide an audio/visual output of the requested data track.

While these audio may be suitable for the purposes for which they were designed, they would not be as suitable for the purposes of the present invention, as hereinafter described.

SUMMARY OF THE PRESENT INVENTION

The present invention discloses an audio video retrieval and playback apparatus for a single use. The present invention comprises a housing having a viewing screen thereon which can be sealed and packaged having a headphone with a pair of earpiecess along with wiring which connects the headphone to the housing. The present invention further comprises a play button, along with a stop button having a slot which accepts audio-visual cards along with a pair of ports for interfacing with a vending machine or another computer. The audio video data can be retrieved from an external database having a plurality of audio video data for download. A user views the collection of audio video data and selects an audio video datafile for download to a disposable player that will retain the audio video datafile until single use playback is engaged by the user. The datafile or storage device having the audio video datafile will be altered preventing any further playback after the single use playback is completed. While the datafile can be retrieved from any number of devices the preferred method would be to retrieve the datafile from a database having a plurality of datafiles such as from the Internet or from a vending machine. The audio video player having a communication port therein is plugged into the download device whereupon the user selects the audio video datafile for download. The audio video player stores the downloaded datafile until the audio video player playback function is selected. The disposable audio video player can be stopped during playback and started again from the stopped position. Once playback is completed the datafile will be altered preventing any further playback of the downloaded audio video datafile.

A primary object of the present invention is to provide a single use disposable audio video player.

Another object of the present invention is to provide a single use audio video player having a housing for storing audio video data until such time as playback is desired.

Yet another object of the present invention is to provide an audio video player having a receptacle for inserting a storage device having audio video data stored thereon.

Still yet another object of the present invention is to provide an audio video player having a port for downloading an audio video data file from a storage device such as a computer or vending machine.

Another object of the present invention is to provide an audio video player having control buttons for selectively starting and stopping the player during single play usage.

Yet another object of the present invention is to provide an audio video player having control means for disabling the player after a single usage.

Additional objects of the present invention will appear as the description proceeds.

The present invention overcomes the shortcomings of the prior art by providing an audio video retrieval and playback apparatus for a single use. The audio video data can be retrieved from an external database having a plurality of audio video data for download. A user views the collection of audio video data and selects an audio video datafile for download to a disposable player that will retain the audio video datafile until single use playback is engaged by the user. The datafile or storage device having the audio video datafile will be altered preventing any further playback after the single use playback is completed.

Furthermore, the disposable audio video player can be stopped during playback and started again from the stopped position. Once playback is completed the datafile will be altered preventing any further playback of the downloaded audio video datafile.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
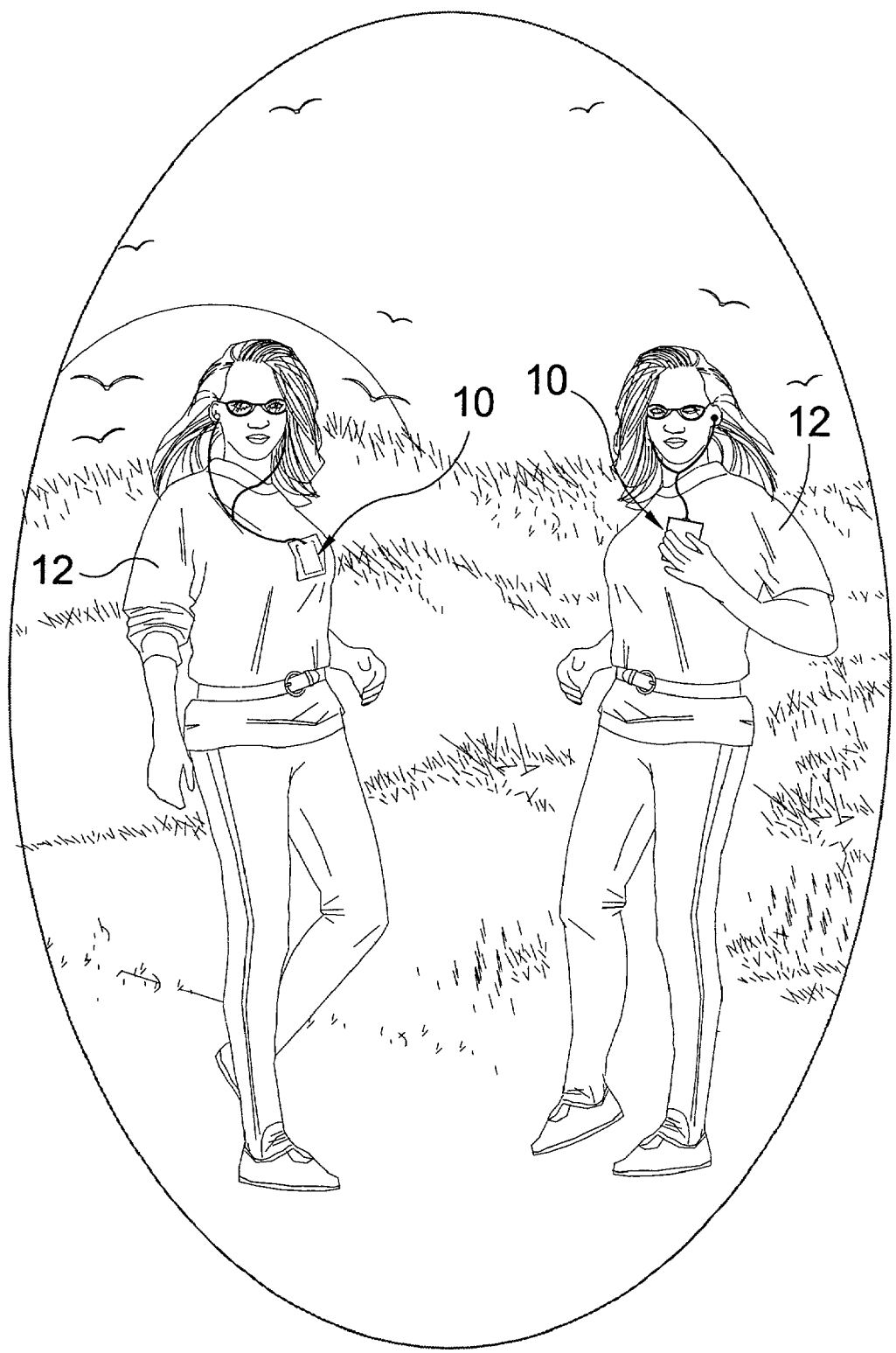
FIG. 1 is a perspective view of the single use media device.

With regard to reference numerals used, the following numbering is used throughout the drawings.

- 10 present invention
- 12 user
- 14 sealed package
- 16 headphone
- 18 earpiece
- 20 wiring
- 22 viewing screen
- 24 play button
- 26 stop button
- 28 slot
- 30 vending machine port
- 32 computer port
- 34 wire frame
- 36 cut
- 38 source material
- 40 source material
- 42 source material
- 44 search
- 46 display
- 48 select
- 50 calculate
- 52 pay for material
- 54 program device
- 56 transmit
- 58 download
- 60 access
- 62 playback
- 64 disable
- 66 card programmed
- 68 user purchases card

DETAILED DESCRIPTION OF THE PREFERRED EMBODIMENT

Turning now descriptively to the drawings, in which similar reference characters denote similar elements throughout the several views, FIGS. 1 through 9 illustrate the present invention wherein a single-use media device is disclosed.

Turning to FIG. 1, shown therein is a perspective view of the single use media device of the present invention 10 being carried about by a user 12. The present invention 10 is a self-contained, single use media device that on user demand will search, retrieve and play back a single time stored audio, visual or audiovisual files.

Figure 2:
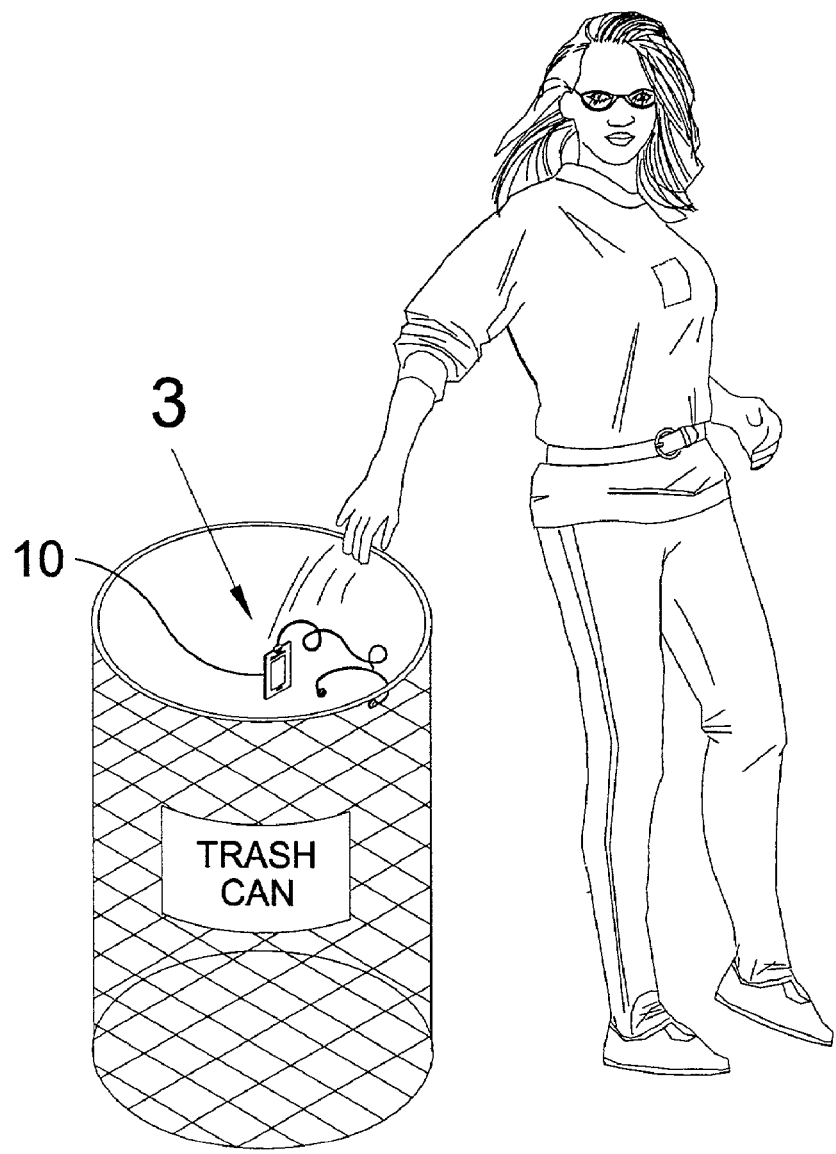
FIG. 2 is a perspective view of the single use media device.

Turning to FIG. 2, shown therein is a perspective view of the single use media device of the present invention 10. The present invention 10 is a self-contained, disposable, single use media device that on demand will retrieve and play back a single time stored audio, visual or audiovisual files. After use, the present invention 10 may be disposed.

Figure 3:
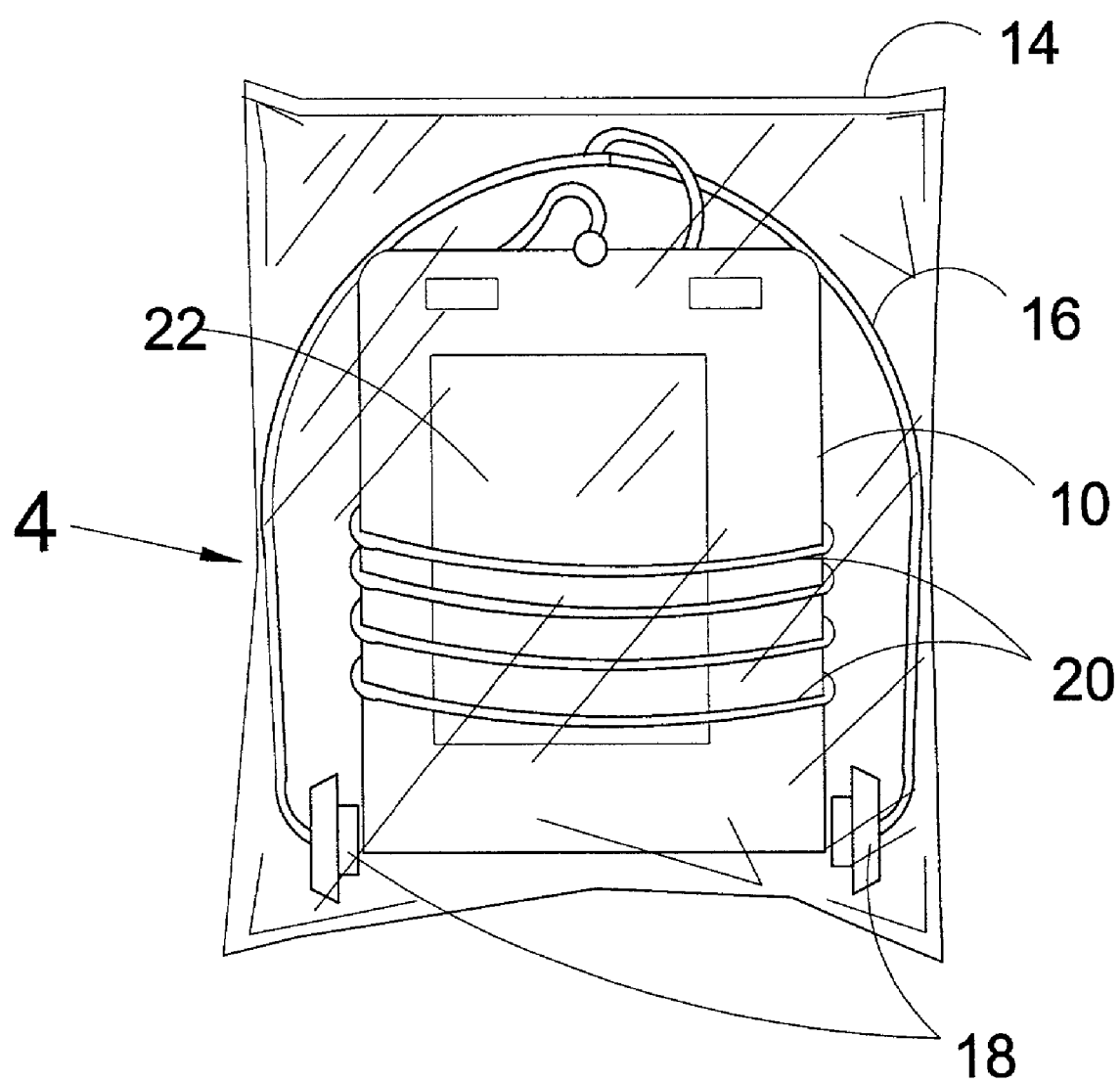
FIG. 3 is a front view of the packaged invention.

Turning to FIG. 3, shown therein is a front view of a sealed package 14 containing the present invention 10. The present invention 10 is shown wrapped and sealed in packaging 14. Also shown is the one-piece headphone 16 with a pair of earpieces 18 having the earphone wiring 20 wrapped around the housing unit along with the viewing screen 22 of the present invention.

Figure 4:
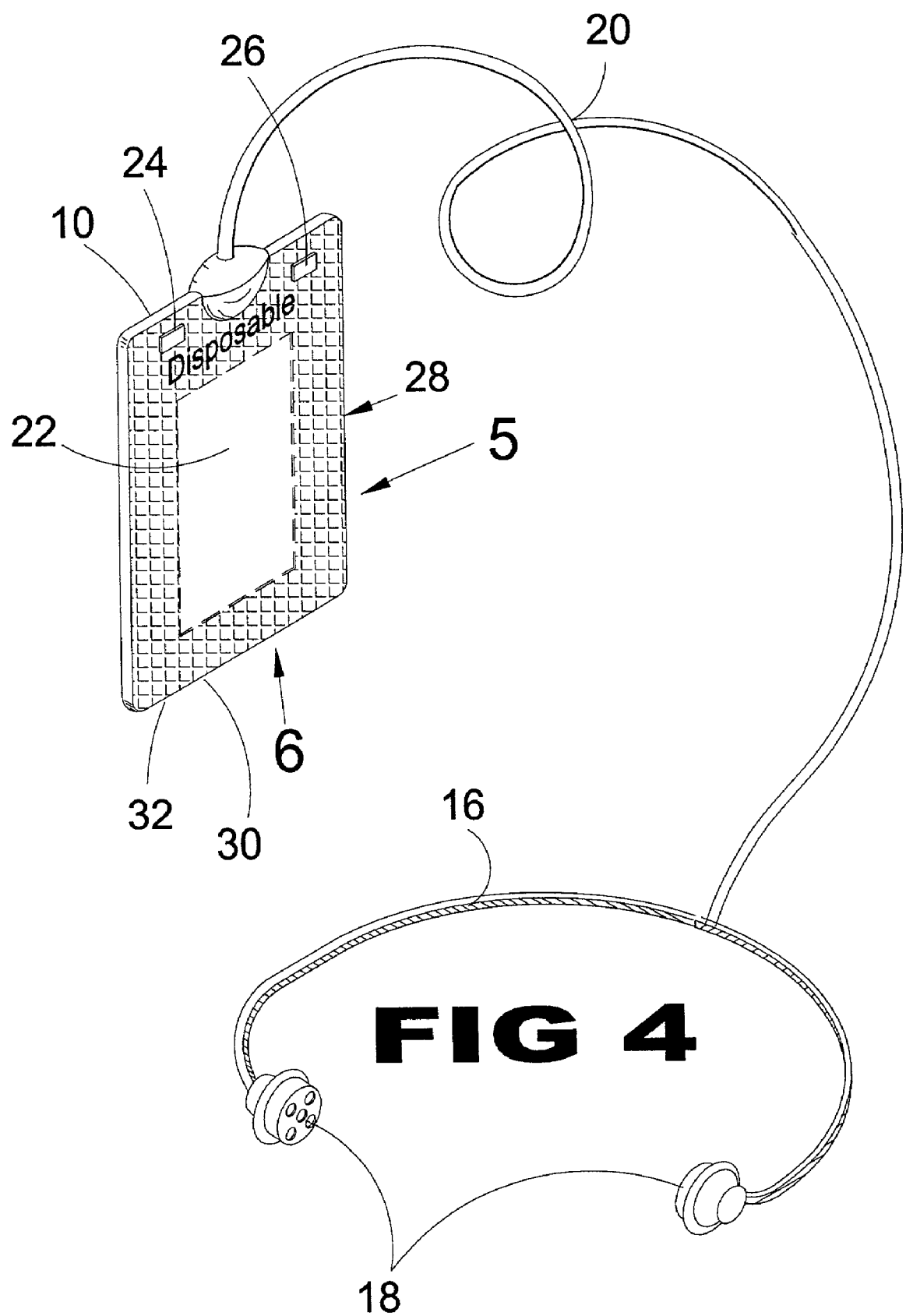
FIG. 4 is an isometric view of the invention.

Turning to FIG. 4, shown therein is an isometric view of the present invention 10. The present invention 10 is designed to accommodate a selected number of sound tracks. After the tracks have been listened to, the source material may not be reused. Shown therein is the one-piece adjustable headphones 16 having a pair of earpieces 18 thereon along with the wiring 20 for attaching the earphones to the present invention 10. Also shown is the viewing screen 22 of the present invention. Also shown is a play button 24 along with a stop button 26 disposed on the housing face of the present invention. Also shown is a slot 28 to accept pre-recorded audio, visual, or audio-visual cards, a port 30 to interface with a vending machine and a port 32 to interface with a computer which is connectable to the internet. The ports 30, 32 and slot 28 could be any conventional type of port such as would be provided by one skilled in the art.

Figure 5:
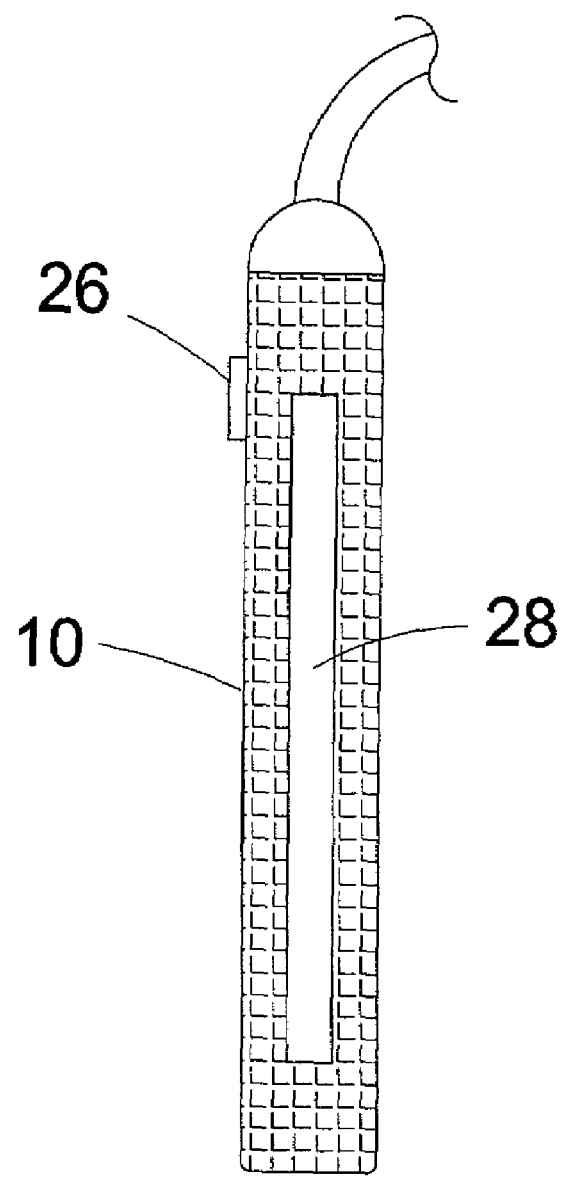
FIG. 5 is a side view of the invention.

Turning to FIG. 5, shown therein is a side view of the present invention 10. The present invention will save audio, visual or audiovisual files for on demand one-time playback. Also shown are the stop button 26 and side slot 28 for accepting pre-recorded cards.

Figure 6:
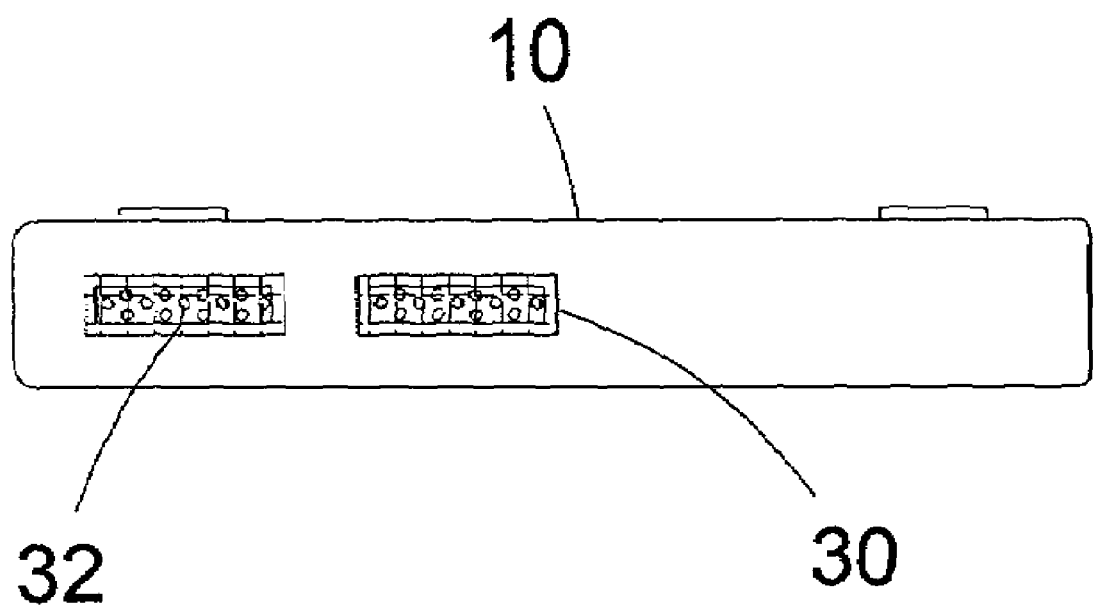
FIG. 6 is a bottom view of the invention.

Turning to FIG. 6, shown therein is a bottom view of the present invention 10. The present invention will save audio, visual or audiovisual files for on demand one-time playback. Also shown are the vending machine port 30 and computer port 32.

Figure 7:
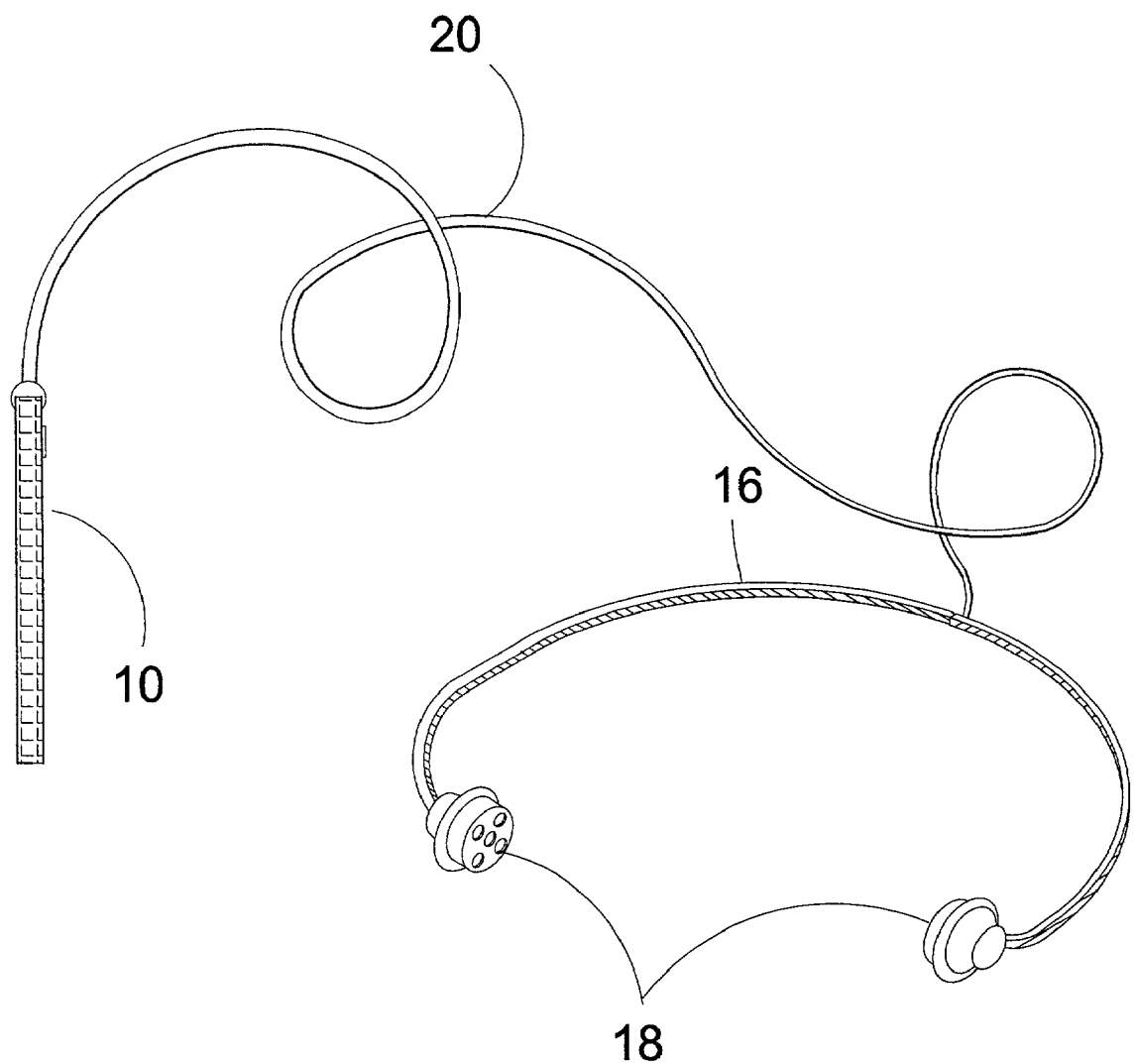
FIG. 7 is a side view of the single use media device.

Turning to FIG. 7, shown therein is a side view of the single use media device 10. The present invention is wafer thin and may be carried in a pocket. The compact housing may be constructed of a durable, inexpensive plastic. Also shown are the headphones 16, earpieces 18 and wiring 20.

Figure 8:
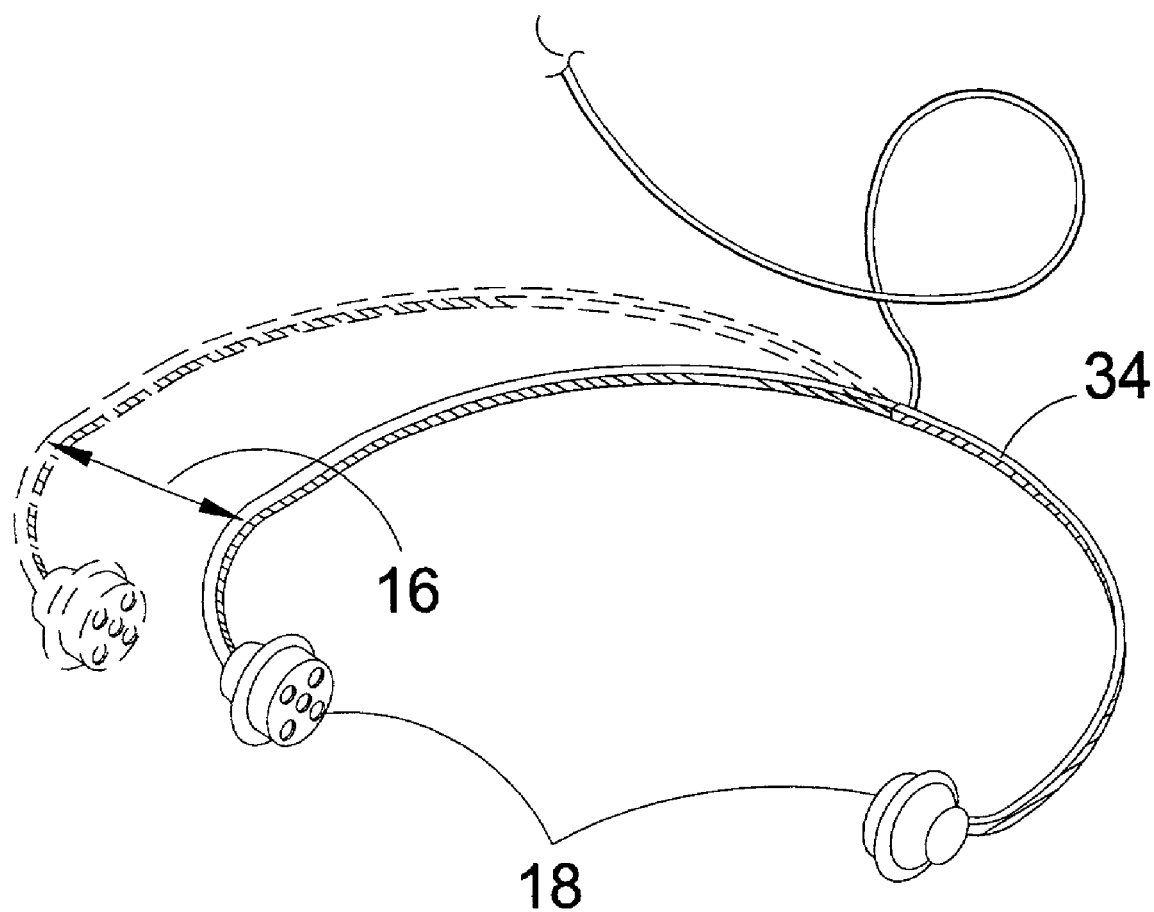
FIG. 8 is a detail view of the headphone of the present invention.

Turning to FIG. 8, shown therein is a detail view of the expandable, disposable headphone 16 of the present invention 10. Depicted is the head phone set 16 of the present invention which can be adjusted to fit any size head by pulling outwardly on the wire frame 34. It is also sealed within the packing to prevent contamination. Also shown are the earpieces 18 and wiring 20 cut at 36 to lead to the housing of the present invention.

Figure 9B:
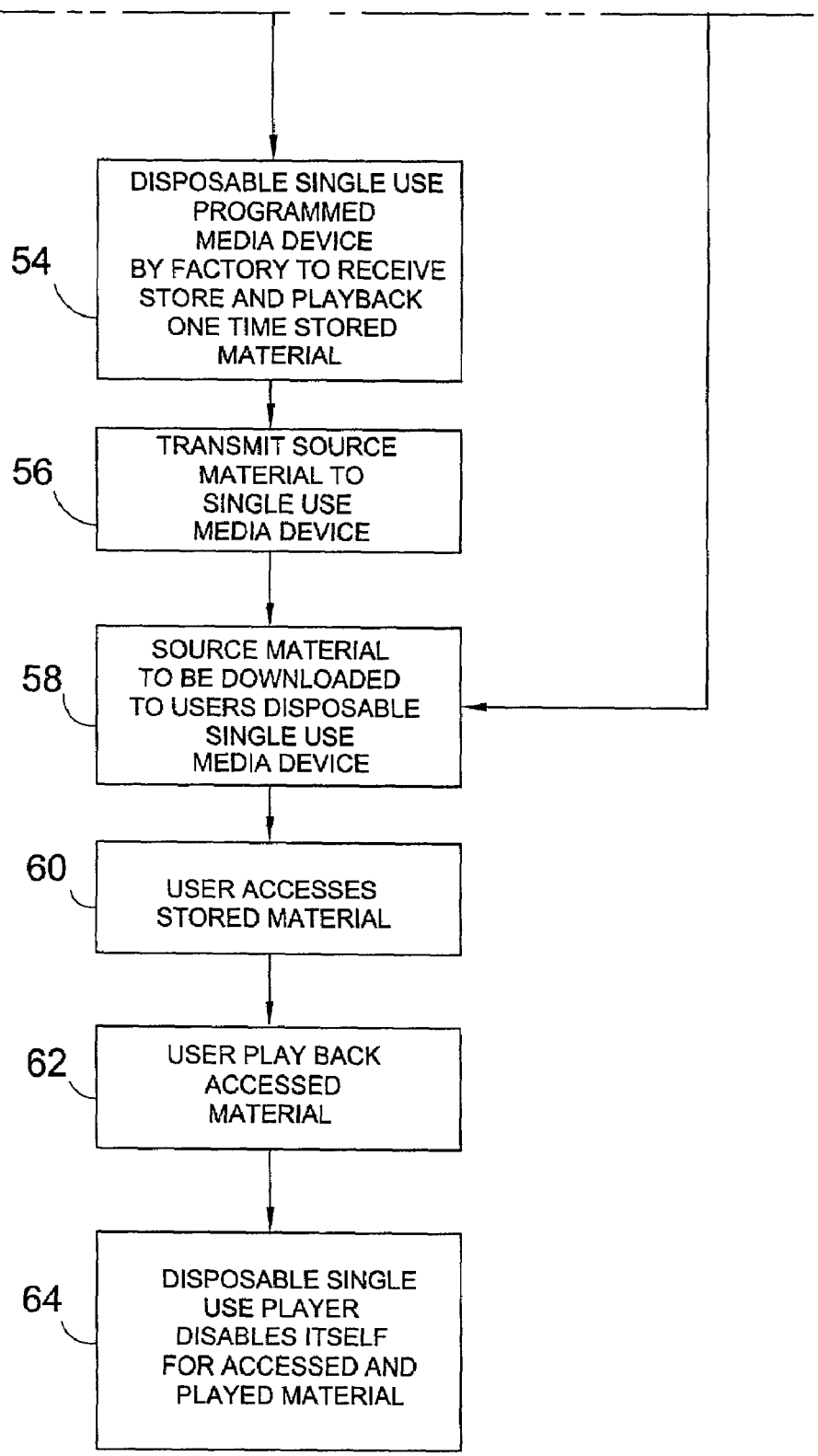
FIG. 9 is a block diagram of the method and apparatus of the present invention.

Turning to FIGS. 9A and 9B, shown therein is block diagram illustrating the method and apparatus for using the audio video playback device of the present invention. Shown therein is the source material on the Internet 38 and the source material in vending machines 40 along with source material on the storage medium 42, such as a card. The present invention will then perform a search for the source material or information with the computer 44, display the source material 46, select the source material to be downloaded into the disposable single-use media device 48, calculate the cost of the selected material 50, and pay for the material by transmitting credit card information to the provider of selected source material 52. Also shown at 54 is the disposable, single-use programmed media device by the factory to receive, store, and playback one-time stored material, transmit source material to the single-use media device 56, the source material to be downloaded to the user's disposable, single-use media device 58, the user accesses the stored material 60, the user plays back the access material 62, and the disposable, single-use player disables itself for accessed to played material 64. Also shown is a card programmed so that it may be downloaded one time at 66, along with the user purchases card with the preloaded material 68.

I claim:

1. A method for using a single use playback device, comprising the steps of:
 a) providing a housing for containing the device;
 b) placing a computer internal to the housing;
 c) searching a computer internal to the housing;
 d) displaying the source material;
 e) selecting the source material to be downloaded to the device;
 f) calculating the cost of the selected source material;
 g) paying for the selected source material by transmitting credit card information to the provider of the selected source material;
 h) disabling said playback device after playing back said selected material one and only one time; and
 i) disposing of said one time use playback device.

2. The method of claim 1, further comprising the step of using the Internet for the source material.

3. The method of claim 1, further comprising the step of using a vending machine for the source material.

4. The method of claim 1, further comprising the steps of using a storage media for the source material.

5. The method of claim 1 on which said device is an audio-visual playback device.

6. The method of using a single use playback device, comprising the steps of:
 a) purchasing said single use playback device containing a source of selected material and a mechanism for playing back said selected source material;
 b) playing back said selected source material once and only once, wherein said playback device disables itself after playing back said selected source material; and
 c) disposing of said device including said mechanism and source of selected material.

7. The method of claim 6 in which said mechanism includes speakers.

8. The method of claim 7 in which said mechanism includes a video display.

\* \* \* \* \*